United States Patent
Chen

(10) Patent No.: US 7,814,552 B2
(45) Date of Patent: Oct. 12, 2010

(54) METHOD AND APPARATUS FOR AN ENCRYPTION SYSTEM

(75) Inventor: Hong-Ru Chen, Hsin Chu (TW)

(73) Assignee: Fineart Technology Co., Ltd., Hsin Chu (TW)

( * ) Notice: Subject to any disclaimer, the term of this patent is extended or adjusted under 35 U.S.C. 154(b) by 1475 days.

(21) Appl. No.: 11/161,279

(22) Filed: Jul. 28, 2005

(65) Prior Publication Data

US 2007/0028305 A1 Feb. 1, 2007

(51) Int. Cl.
G06F 7/04 (2006.01)
G06F 15/16 (2006.01)
H04L 9/00 (2006.01)
H04N 7/00 (2006.01)
G06F 21/24 (2006.01)
G06F 21/00 (2006.01)
G09C 1/00 (2006.01)
H04L 29/06 (2006.01)

(52) U.S. Cl. .................. 726/26; 380/277; 726/2; 709/206; 386/94

(58) Field of Classification Search .......... 726/26
See application file for complete search history.

(56) References Cited

U.S. PATENT DOCUMENTS 7,382,883 B2 * 6/2008 Cross et al. .................. 726/26
2005/0078944 A1 * 4/2005 Risan et al. .................. 386/94

FOREIGN PATENT DOCUMENTS

WO WO 9944691 A1 * 9/1999

OTHER PUBLICATIONS

Cédric Fournet, Gurvan Le Guernic, Tamara Rezk, "A security-preserving compiler for distributed programs: from information-flow policies to cryptographic mechanisms", Nov. 2009, CCS '09: Proceedings of the 16th ACM conference on Computer and communications security, Publisher: ACM, pp. 432-441.*

* cited by examiner

Primary Examiner—Matthew B Smithers
Assistant Examiner—Courtney D Fields

(57) ABSTRACT

This invention relates to a method and apparatus for an encryption system. The encryption system includes a server end and user's ends, in which the whole writable action about information outflow is recorded by the server end. The method of the present invention is used for encrypting the writable file by the user's ends to avoid unauthorized information outflow through out-connecting storing equipment. Therefore, all the files are just used within the Intranet of the company and the security system. Thus, the purpose of protecting information is achieved.

16 Claims, 5 Drawing Sheets

METHOD AND APPARATUS FOR AN ENCRYPTION SYSTEM

BACKGROUND OF THE INVENTION

1. Field of the Invention

The present invention relates to and method and apparatus for an encryption system, more particularly to protecting and preventing the Intranet information from unauthorized outflow.

2. Description of the Related Art

Devices for processing data and relative techniques for communication are becoming increasingly popular and widely used. Therefore, devices with various functions to process data have been developed. With the advance of computer technology, surrounding equipment for processing data are enhanced to match the modern needs and manufacturing competition has accordingly increased. However, other relative security problems arise at the same time, such a dispersion system of the Intranet.

The dispersion system comprises a plurality of user's ends s and the server end. The information flow is quite amazing. However, for avoiding unauthorized outflow of internal information, several methods are provided, such a firewall□antivirus program of the security system, which is used to avoid hacker attacks or information outflow through the Internet. No special protection methods are currently disclosed to avoid data outflow as using out-connecting storing equipment, especially concerning CD-Rs.

As the size of CD-Rs gradually decreases, the problems of easily removing unauthorized copied files are generated. According to the purpose of the invention, various methods for protecting files are proceeded with various strategies. The critical point is that the user's ends needs to link up with the server end for passing information after acquiring authorization when the Intranet information begins outflow, or encrypting the information through the server end, and then delivering the dummy information back to the user's ends. Through this way, huge loading is produced within the local Intranet, and the velocity of communication is decreased. Because the Intranet multi-connections of the Internet are preceded within the huge Intranet, at the same time, the resource of the system is occupied. Therefore, with back-and-forth delivering information, significant time is wasted. With application of modern techniques, similar situations will not happen.

As described above, how to make data flow of the Intranet be secure yet able to be encrypted by the ordinary users has remained quite practical according to the present invention.

SUMMARY OF THE INVENTION

In view of the aforesaid aspect, a method and an apparatus for an encryption system is provided according to the present invention.

According to main object of the present invention, writable files are encrypted through the user's ends so as to avoid data outflow through out-connecting storing equipment, so information security is not damaged and the benefits of a company are not risked According to the present invention, the encryption system and method at least comprises: setting up a database and maintaining function through the server end; with various selection modes, connecting with the server end through the Internet; acquiring and confirming the newest data from the server end; processing with a single machine at the user's ends; examining whether the command of controlling and sending the writable file to out-connecting storing equipment exists by the user's ends; and acquiring security set from database of the user's ends. The user's ends examines whether the writable files are controlled and encrypted by using an encryption key after acquiring data; encrypting the information according to the security set; delivering the files to out-connecting storing equipment and then setting them as secure files; storing the encrypted files into recording media by out-connecting storing equipment; and, restoring the recorded files into the database of the server end by using the encryption key.

The objects, features, and effects of the present invention will be more readily understood from the following detailed description of the preferred embodiments with the appended drawings.

DETAILED DESCRIPTION OF THE PREFERRED EMBODIMENTS

Figure 1:
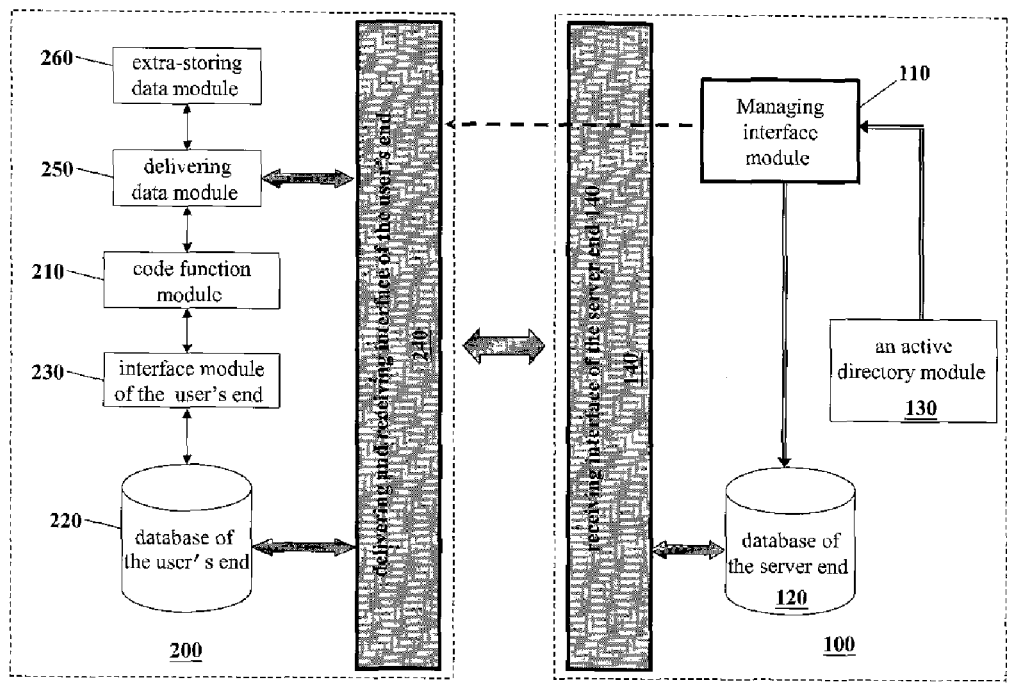
FIG. 1 is a structure diagram of an encryption system according to the present invention.

A method and apparatus for an encryption system and method to avoid unauthorized information outflow for protecting data of a company are disclosed. Referring to FIG. 1, it is a structure diagram of an encryption system according to the present invention.

The structure of the system of the present invention includes: the server end 100 and at least one user's end 200; the user's end 200 connecting to the server end 100 through the Intranet; recording the whole writable action by the server end; encrypting the writable files through the user's ends to avoid data outflow; receiving and delivering data by the server end 100; integrating and managing information of the company; storing the secure set and using records of the user's end 200; updating function of the secure set information at the user's end 200; the function includes: (1) managing interface module 110 (2) database of the user's ends 120 (3) active directory module 130 (4) delivering and receiving interface of the server end 140; further explaining as follows: (1) managing interface module 100, which provides a managing interface to directly request and control the server end 100; (2) database of the server end 120, which provides one space to restore data of the server end and other input data so as to directly access the data; (3) active directory module 130, which is used to acquire information of a company and department groups through Lightweight Directory Access Protocol (LDAP) and restore the information into a database of the server end 120. (4) delivering and receiving interface of the server end 140, which is used for receiving information from the user's end 200, restoring information into database of the server end 120, and delivering information from the server end 100.

The user's end 200, which is used for receiving and delivering information, is operated with a single machine. The secure set is used by the user's end 200 to write an ordinary file and a secure file for encrypting information. The user's end 200 comprises: the code function module 210☐database of the user's end 220☐interface module of the user's end 230☐delivering and receiving interface of the user's end 240☐delivering data module and extra-storing data module. The user's end 200 is further described as follows: (1) the code function module 210, which is a protection mechanism to prevent data outflow of the user's end 200; examining the difference between the ordinary file and the secure file through the secure set; the ordinary file is not encrypted with the encryption key and presented by an enclosed document; (2) database of the user's end 220, which provides one space for restoring information of the user's end 200 and input data, and directly accesses the secure file; the secure file is encrypted by using the encryption key and presented by an enclosed document; (3) interface module of the user's end 230, which is a user interface, and used for reading a writable file after acquiring the secure set; then, encrypting the writable file to produce a secure file by using an encryption key; sending the secure file to an out-connecting storing equipment 262, and requesting the code function 210 to pass the secure file; (4) delivering and receiving interface of the use's end 240, which is used for receiving data from the server end 100, restoring into database of the use's end 220 and delivering the data from the user's end 200; (5) the delivering data module 250, which is used to deliver the secure file to an out-connecting storing equipment 262 after the encryption key is delivered to database of the server end 120; (6) extra-storing data module 260, which is used to receive and store the secure file into recording medium after receiving the secure file by the out-connecting storing equipment. The foregoing secure set includes various users' names and specific machine signals on a computer.

The encryption method of the use's end 200 is proceeded by using an asymmetric encryption key and a symmetric encryption key. Therein, the asymmetric encryption key is selected from any of PKI☐RSA Algorithm or elliptic curve code, and the symmetric encryption key is selected from any of Blowfish☐AES☐Triple DES☐DES☐IDEA☐RC5☐CAST-128 and RC2. The foregoing out-connecting storing equipment is selected from floppy disk driver☐CD-R☐ ZIP☐MO☐ recording device☐Universal Serial Bus(USB)☐connection line connecting to a Universal Serial Bus☐connection line of Parallel Port☐connection line of Serial Port and movable storing data device.

Figure 2:
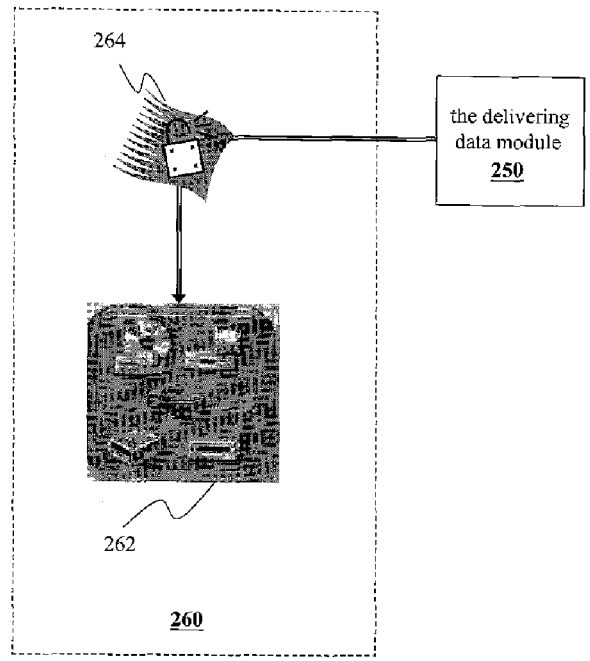
FIG. 2 is a schematic diagram of writing data onto out-connecting storing equipment of the user's ends according to the present invention.

Otherwise, the out-connecting storing equipment 262 is collocated by using a recording medium. The recording medium is selected from recordable CD-R☐recordable magnetic disk recordable driver and memory. The foregoing server end 100 stores a recorded writable file. The recorded file at least includes the following columns: time for writing files, an identifier code of computer machine, a users' name, the name of writable file, thumbprint of files (SHA1 information structure) and random pieces of content. Referring to FIG. 2, it is a diagram for writing data into out-connecting storing equipment by the user's ends. When delivering files to the out-connecting storing equipment 262 by the user's ends, the file is encrypted to produce the secure file 264 through the encryption method aforesaid, and then through the foregoing encryption method the secure file 264 is encrypted with using an encryption key. If the encrypted secure file is opened, the encrypted secure file will be presented with an unreadable folded document.

Figure 3:
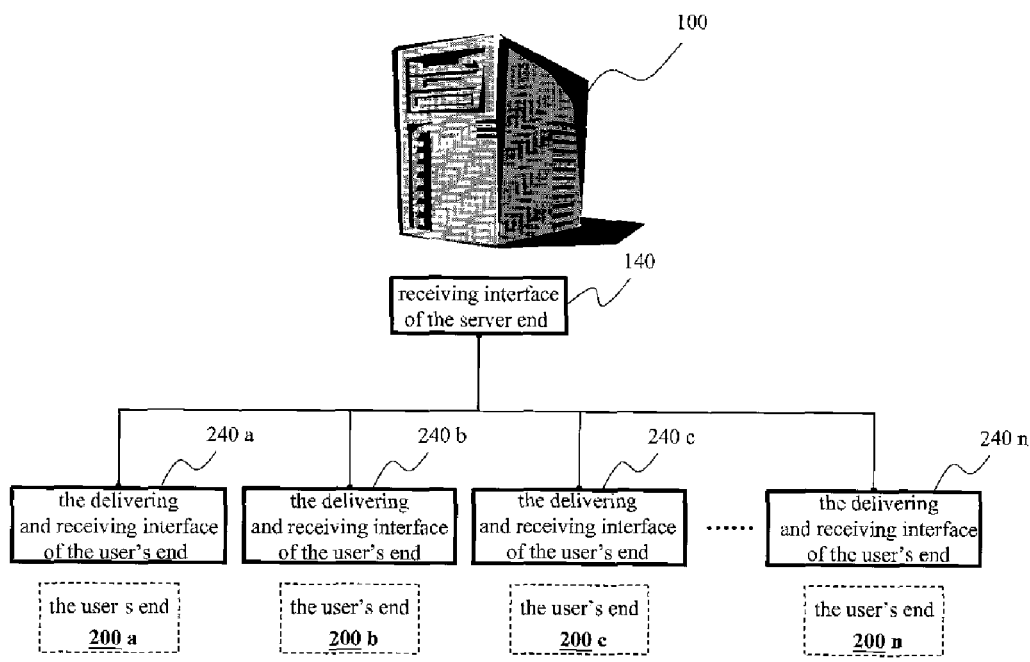
FIG. 3 is a diagram showing the relation between a server end and a plurality of user's ends s according to the present invention.

FIG. 3 is a diagram showing the relation between the server end and a plurality of user's ends s according to the present invention and it mainly explains the server end 100 through receiving interface of the server end 140. FIG. 3 is mainly used to describe a server end 100 which respectively connects to the 200a~200n receiving interface of the 240a~240n delivering user's ends through delivering and receiving interface of the server end 140. Thus, fast delivering is achieved.

Figure 4A:
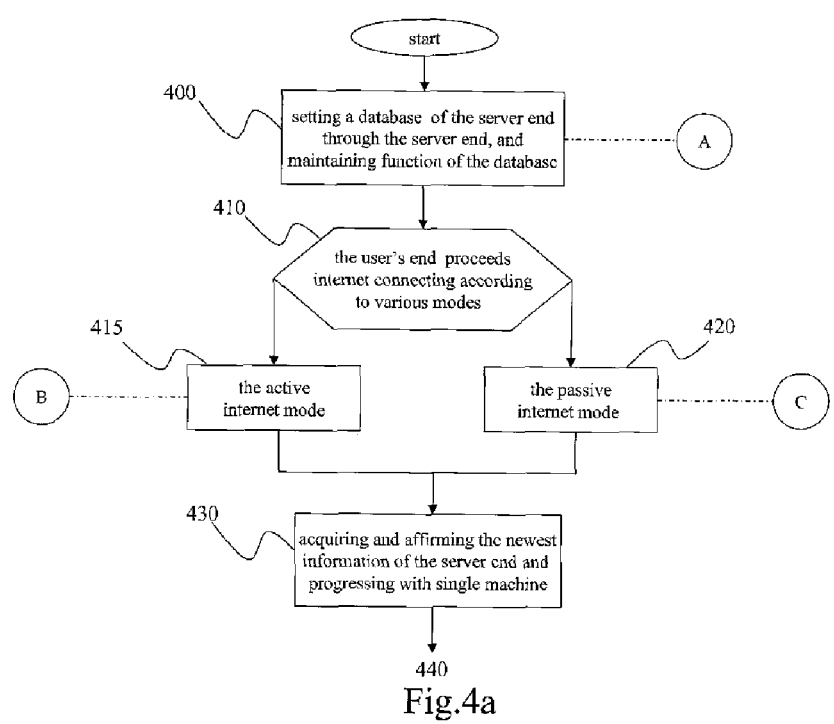
FIG. 4a is a flowchart 1 of the encryption method according to the present invention.
Figure 4B:
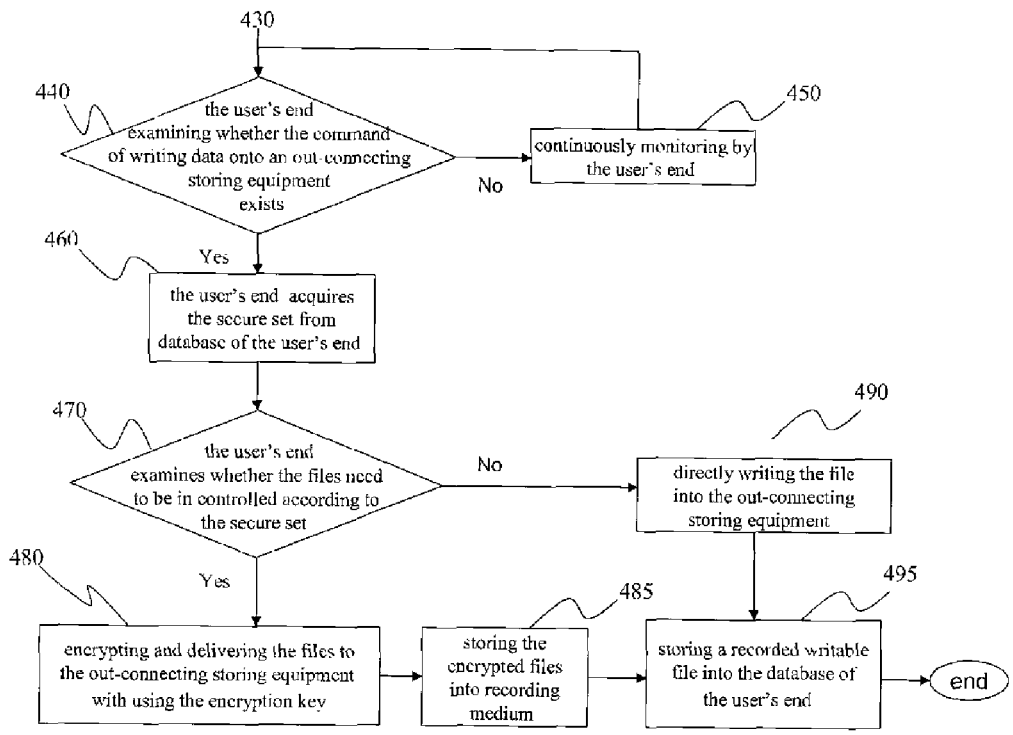
FIG. 4b is a flowchart 2 of the encryption method according to the present invention.

Referring to FIG. 4a and FIG. 4b, it is a flowchart 1 of the encryption method to avoid data outflow according to the present invention. FIG. 4b is a flowchart 2 of the encryption method to avoid data outflow according to the present invention. It is described as follows: first, setting a database 120 of the server end through the server end 100, and maintaining function of the database 120 (step 400), referring back to the step A.

Figure 5:
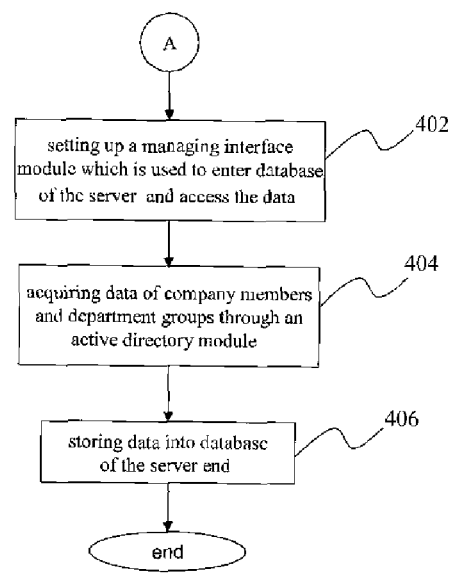
FIG. 5 is a detailed flowchart of setting up a database of user's ends according to the present invention.

Referring to FIG. 5, it is a detailed flowchart about setting up a database of the server end according to the present invention.

After step A, setting up a managing interface module 110 which is used to enter database of the server 120 and access the data (step 402). Next, acquiring data of company members and department groups through an active directory module 130 (step 404). Finally, storing data into database of the server end 120 (step 406). Then referring back to FIG. 4a, the flow is continued after step 400. The user's end 200 proceeds an Internet connecting (step 410) according to various modes (step 410). The Internet modes are divided into the active Internet mode (step 415) and the passive Internet mode (step 420). Respectively entering step B and step C, the two Internet modes will be explained later after describing FIG. 4a and FIG. 4b. First, acquiring and affirming the newest information of the server end 100; then progressing with single machine (step 430); next, examining whether the command of writing data onto an out-connecting storing equipment 262 exists (step 440). If the command about writing files to out-connecting storing equipment 262 is not received, continuously monitoring by the user's end 200 (step 450) and then back to step 440. If receiving the command of sending writable files to the out-connecting storing equipment 262, the user's end 200 acquires the secure set from database of the user's end 220 (step 460). The secure set includes various users' name and specific signals. Then, the user's end 200 examines whether the files need to be controlled according to the secure set (step 470). If the result is "no", directly writing the file into the out-connecting storing equipment 262 (step 490), and then setting the file as an ordinary file; storing a recorded writable file into the database of the user's end 220 (step 495) If the result is "yes", encrypting and delivering the files to the out-connecting storing equipment 262 by using the encryption key (step 480); then storing the encrypted files into a recording medium (step 485) by out-connecting storing equipment 262 (step 485). Finally, storing a writable file into database of the user's end 220 (step 495) and closing the flow.

Figure 6A:
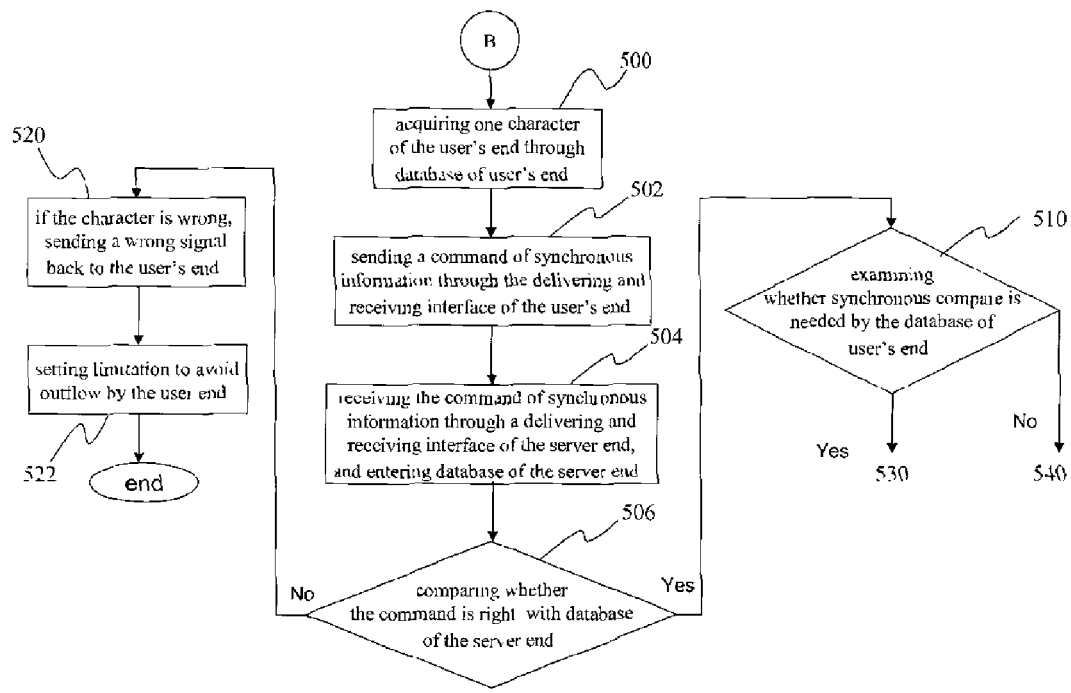
FIG. 6a is a detailed flowchart 1 of an active Internet mode of the user's ends according to the present invention.
Figure 6B:
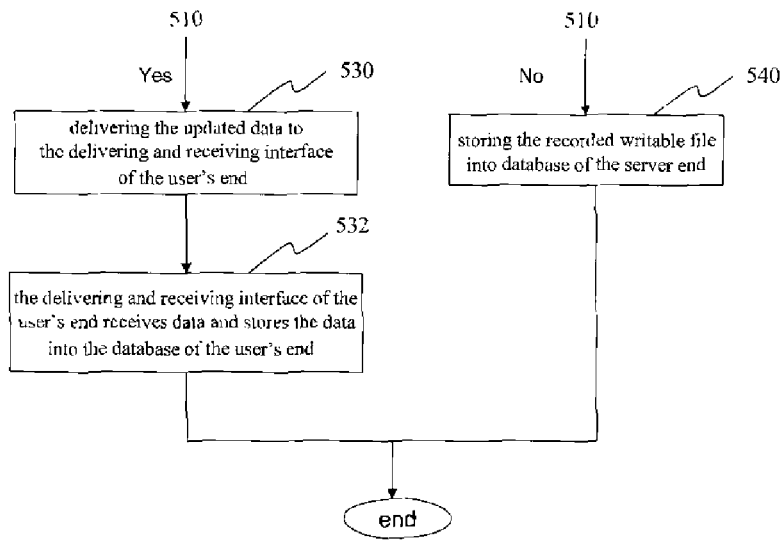
FIG. 6b is a detailed flowchart 2 of an active Internet mode of the user's ends according to the present invention.

After step B, the flow is explained as follows. Referring to FIG. 6a and FIG. 6b, FIG. 6a is a detailed flowchart 1 of the active Internet mode of the user's ends according to the present invention. FIG. 6b is a detailed flowchart 2 of the active Internet mode of the user end according to the present invention. After step B, acquiring one character of the user's end 200 through a database of the user's end 220 (step 500). The character is about selectively choosing a specific machine signal on the computer and its users' name Next, sending a command of synchronous information through the delivering and receiving interface of the user's end 240 (step 502).

After sending the command, receiving the command of synchronous information through a delivering and receiving interface of the server end 140, and entering database of the server end 120 (step 504) and then the database 120 of the server end comparing the characteristics of the information to determine if it is right or not. Subsequently, comparing whether the command is right with database of the server end 120 (step 506) If the character is wrong, sending an error signal back to the user's end 200 (step 520); setting limitation to avoid outflow by the user end 200 (step 522). If the character is exactly right, examining whether synchronous comparison is needed by the database of the user's end 220 (step 510). If the result is "no", storing the recorded writable file into database of the server end 120 (step 540). If the result is "yes", through the delivering and receiving interface 140, delivering the updated data to the delivering and receiving interface of the user's end 240 (step 530). Finally, the delivering and receiving interface of the user's end 240 receives data and stores the data into the database of the user's end 220 (step 532), and then closing the flow.

The trigger time of the active Internet mode in FIG. 1 is selected from any of required information which is from the server end 100☐first Internet connect. The first Internet connect is operative after turning on or freely setting a time period by the user's end 200. Next, describing the detail flow after step C; the step C is divided into step C1 and step C2. In step C1, the system is informed to change set (step C1). In step C2, the system directly delivers the changing set (step C2).

Figure 7A:
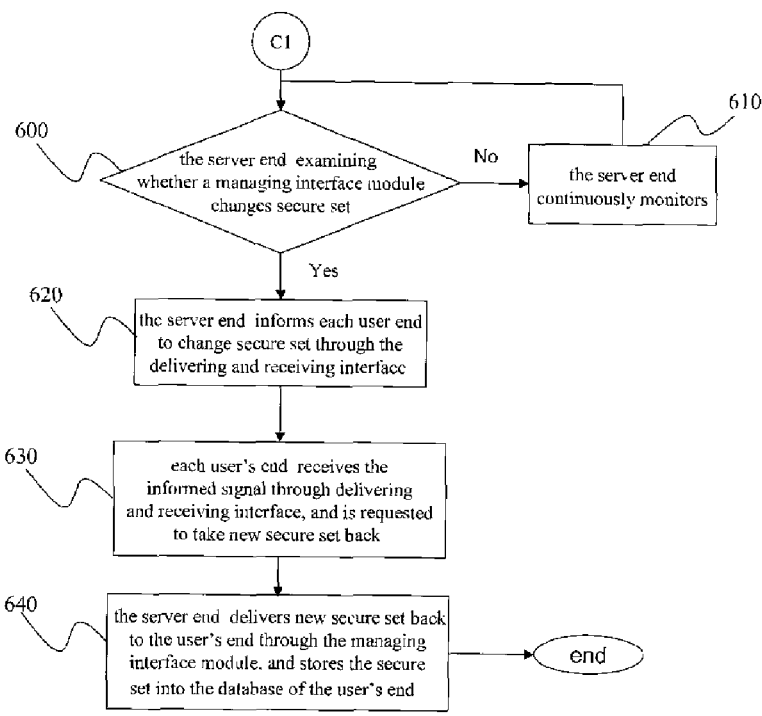
FIG. 7a is a detailed flowchart showing a passive Internet mode of the user's end, which is informed to change set through the server end.
Figure 7B:
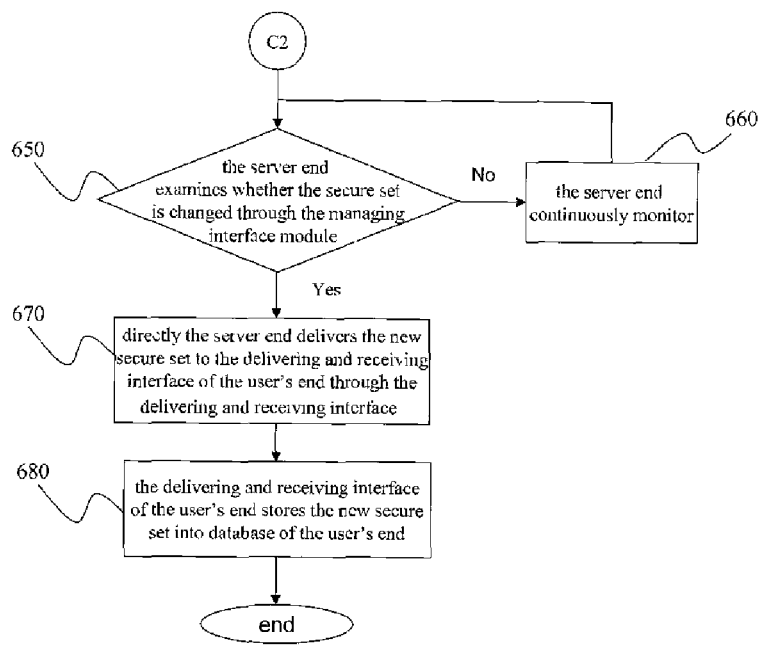
FIG. 7b is a detailed flowchart showing a passive Internet mode of the user's ends, which delivers changing set through a server end.

Referring to FIG. 7a and FIG. 7b, FIG. 7a is a detailed flowchart showing a passive Internet mode of the server end. The passive Internet mode is informed to change set through the server end. FIG. 7b is a detailed flowchart showing a passive Internet mode of the user's ends the passive Internet mode delivers a changing set through the server end.

After step C1, the server end 100 examines whether a managing interface module changes a secure set (step 600). If the secure set is not changed, the server end 100 continuously monitors (step 610) and goes back to step 600; if the secure set is changed, the server end 100 informs each user end 200 to change the secure set through the delivering and receiving interface 140 (step 620). Then, each users' end 200 receives the informing signal through delivering and receiving interface 240, and is requested to take a new secure set back (step 630). Finally, the server end 100 delivers a new secure set back to the user's end 200 through the managing interface module 110, and stores the secure set into the database of the user's end 220 (step 640), and closing C1.

After step C2, the server end 100 examines whether the secure set is changed through the managing interface module 110 (step 650). If the secure set is not changed, the server end continuously monitors the secure set. If the secure set is changed, the server end delivers the new secure set directly to the delivering and receiving interface of the user's end 240 through the delivering and receiving interface 140 (step 670). Finally, the delivering and receiving interface of the user's end 240 stores the new secure set into the database of the user's end 220 (step 680).

While embodiments of the invention have been illustrated and described, it is not intended that these embodiments illustrate and describe all possible forms of the invention. The words used are words of description rather than limitation, and it is understood that various changes may be made without departing from the spirit and scope of the invention.

What is claimed is:

1. An encryption system, comprising a server end and least one of user's ends; the encryption system is operative to record the whole writable action by the user's ends, and encrypt writable files by the user's ends to avoid information overflow from an entrusted network; the encryption system comprising: the server end for receiving and delivering information, organizing and managing information, storing a secure set and using records of the user's ends, and updating function to surely set data at the user's ends; and database of the server end, for providing one space to store data of the server end and other input data, and directly accessing the stored data;

a managing interface module, for providing an managing interface to a system operator directly to request and manage the server;

an active directory module, for receiving information of company members and department groups, and for restoring database of the server end through Lightweight Directory Access Protocol (LDAP);

an interface of delivering and receiving information of the user's ends, for receiving information from the user's ends, restoring information into database of the server end, and delivering information from the server end; the user's ends, which are used for receiving transmitted information, writing an ordinary file and a secure file to encrypt the information by using a single machine through the secure set, the user's ends at least comprising:

a database of the user's ends, for providing one space to store data of the user's ends and input data to directly access the data;

a code function module, which is a protection mechanism to avoid unauthorized outflow of information from the user's ends, for examining difference between the ordinary file and the secure file through the secure set;

an interface module of the user's ends, which is an interface used for reading a writable file after acquiring the secure set, encrypting the writable file to produce a secure file by using an encryption key; after sending the secure file to an output storage equipment, the interface module of the user's ends requests the code function module to pass the secure file;

a delivering data module, for delivering the secure file to the output storage equipment when the secure file passes said code function module, and delivering the encryption key to database of the server;

an external accessing data module, for recording the secure file on recording medium after receiving the secure file by the output storage equipment; and a delivering and receiving data interface of the user's ends, for receiving information of the server end, restoring into database of the user's ends, and delivering information from the user's ends.

2. The encryption system as recited in claim 1, wherein the user's ends are connected to the server end through the Intranet.

3. The encryption system as recited in claim 1, wherein the secure set includes various users' names and specific machine signals on a computer; and the encryption key is selected from an asymmetric encryption key and a symmetric encryption key; the encryption key is selected from any of PKI, RSA calculus method and elliptic curve code; and the asymmetric key is selected from any of Blowfish, AES, Triple DES, DES, IDEA, RC5, CAST-128 and RC2.

4. The encryption system as recited in claim 1, wherein the ordinary file is not encrypted by the encryption key, and is presented by a plaintext document; and the secure file is encrypted by the encryption key and is presented by an enclosed document.

5. The encryption system as recited in claim 1, wherein the recording medium is selected from any of recordable CDs, recordable diskettes, recordable magnetic disks and memory.

6. An encryption method, which is used for completely recording a plurality of whole writable steps and encrypting writable files by using an encryption key to avoid information overflow from an untreated network, the encryption method comprising steps of:
   setting a database of a server end, and maintaining function through a server end;
   the user's ends connected to the server end through the Internet by selecting various modes;
   the user's ends acquiring and confirming the newest data of the server end, and operative with a single machine, examining whether a command which is about writing files out into an out-connecting storage equipment exists or not;
   the user's ends acquiring a secure set from database of the user's ends;
   the user's ends examining whether the writable files are controlled according to the secure set; the user's ends encrypting and delivering the files to the out-connecting storage equipment, and the files are set as a secure file with using an encryption key;
   the output storage equipment storing the encrypted files on a recording medium; and
   storing recorded writable files and the encryption key into database of the server end.

7. The encryption method as recited in claim 6, wherein the steps for setting up a database of the server end and maintaining function of the server end further comprises:
   setting a managing interface module for entering database of the server end and accessing;
   acquiring information of company members and department groups through an active directory module, and storing information into database of the server.

8. The encryption method as recited in claim 6, wherein the steps for connecting the user's ends user's ends with the server end according to various modes; the steps are separated into an active connecting mode and a passive connecting mode; wherein the passive connecting mode is divided into an informed set for changing and a delivering set for changing through the server end;
   acquiring a character of the user's ends through database of the user's ends;
   sending a command of synchronous information through the delivering and receiving interface of user's ends;
   receiving the command of the synchronous information through the delivering and receiving an interface of the server end, and entering a database of the server end;
   comparing whether the character is correct through database of the server end;
   examining whether database of the user's ends proceeds synchronous comparison with the database of the server end;
   delivering the updated data of the server end through the delivering and receiving interface of the server end; and
   receiving and storing data into the database of the user's ends by the delivering and receiving interface of the users' end.

9. The encryption method as recited in claim 8, wherein the character is about selectively using an identifier code of computer machine and a users' name; and the trigger time of active connecting mode is selected from one of the acquiring information back from the server end, the first time to connect through the Internet after computer on and freely setting a time period.

10. The encryption method as recited in claim 8, wherein the set is informed to change through the server end, the steps comprising:
    the server end examining whether a managing interface module changes the secure set;
    the server end informing each user's end to change the secure set through a delivering and receiving interface of the user's ends;
    each user's end receiving the informed signal through a delivering and receiving interface of the users'end, and requiring return of the newest secure set from the delivering and receiving interface of the server end; and
    the server end delivering the new secure set back to the user's ends through the managing interface module, and the user's ends storing data into database of the user's ends.

11. The encryption method as recited in claim 8, wherein the steps of delivering the set to change directly through the server end, comprises:
    the server end examining whether a managing interface module changes the secure set;
    directly delivering a new secure set to a receiving and delivering interface of the users' server end through a delivering and receiving interface of the servers' end; and
    storing the new secure set into the database of the user's ends through the delivering and receiving interface of the user's ends.

12. The encryption method as recited in claim 6, wherein the secure set includes various users' names and specific machine signals on the computer; the encryption key is selected from an asymmetric key and a symmetric key; the asymmetric key is selected from any of PKI、RSA Algorithm or elliptic curve code; the symmetric key is selected from Blowfish, AES, Triple DES, DES, IDEA, RC5, CAST-128 and RC2, the asymmetric key is selected from any of PKI, RSA Algorithm or elliptic curve code; the symmetric key is selected from Blowfish, AES, Triple DES, DES, IDEA, RC5, CAST-128 and RC2.

13. The encryption method as recited in claim 6, wherein the user's ends are connected to the server end through a local the Intranet in a company.

14. The encryption method as recited in claim 6, wherein the steps of the encryption method comprises recording system time to store the encrypted file into the recording medium.

15. The encryption method as recited in claim 6, wherein the steps further comprise: copying the unencrypted files.

16. The encryption method as recited in claim 6, wherein the recording medium is selected from recordable CDs, recordable magnetic disks, recordable driver and memory.

* * * * *